(12) United States Patent
Prober

(10) Patent No.: US 6,327,521 B1
(45) Date of Patent: *Dec. 4, 2001

(54) PROCESS CONTROL METHOD FOR VENTED POLYMERIZERS

(75) Inventor: James Merrill Prober, Wilmington, DE (US)

(73) Assignee: E.I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,865

(22) Filed: May 28, 1998

Related U.S. Application Data

(60) Provisional application No. 60/048,264, filed on May 29, 1997.

(51) Int. Cl.[7] ............. G01N 31/00; G05B 11/08; G05B 21/00
(52) U.S. Cl. ............. 700/269; 700/266; 525/355; 525/356; 525/359.2; 525/424; 525/434; 528/288; 528/322; 528/335; 528/340
(58) Field of Search .................. 700/266, 269; 427/2.3; 525/434, 424, 355, 356, 359.2; 528/335, 388, 322, 340; 526/153, 65, 348

(56) References Cited

U.S. PATENT DOCUMENTS

| 3,708,658 | * | 1/1973 | Hopkins ............... 235/151.12 |
| 3,754,125 | | 8/1973 | Rothstein . |
| 3,972,946 | | 8/1976 | Ochiai . |
| 4,071,572 | | 1/1978 | Amato et al. . |
| 4,630,038 | | 12/1986 | Jordan . |
| 4,650,832 | * | 3/1987 | Kowalski et al. ............ 525/354 |
| 4,952,345 | | 8/1990 | Rao et al. . |
| 5,034,195 | * | 7/1991 | Platz ................... 422/134 |
| 5,065,336 | | 11/1991 | Buchelli . |
| 5,155,184 | | 10/1992 | Laurent et al. . |
| 5,453,473 | * | 9/1995 | Knauf et al. ............ 526/153 |
| 5,674,974 | * | 10/1997 | Brearly et al. ........... 528/340 |
| 5,804,676 | * | 9/1998 | Hieda et al. ............ 526/65 |
| 5,977,267 | * | 11/1999 | Teasley ................ 525/424 |
| 5,998,572 | * | 12/1999 | Rostami et al. .......... 528/322 |

OTHER PUBLICATIONS

J. A. Brydson, Plastics Materials, 5th ed., Butterworth–Heinemann United Kingdom, 1989.

* cited by examiner

*Primary Examiner*—Ario Etienne
*Assistant Examiner*—Frantz B. Jean

(57) ABSTRACT

A method for controlling the properties of the product polymer of a polymerization process to improve the process productivity and product quality in both batch and continuous production of polyamides.

17 Claims, 2 Drawing Sheets

PROCESS CONTROL METHOD FOR VENTED POLYMERIZERS

This application claims benefit of Provisional Application No. 60/048,264 filed May 29, 1997.

FIELD OF THE INVENTION

This invention relates to a method for monitoring the rate of evolution of volatile species during polymerizations and the use of that method to effect improvements in process and product. In particular, this invention is useful for improving the process productivity and product quality in both batch and continuous production of polyamides.

BACKGROUND OF THE INVENTION

Condensation polymerization is well-known in the art, and is in widespread commercial use for the production of numerous polymers, most notably polyesters and polyamides, as described in *Plastics Materials*, 5th ed., by. J. A. Brydson, Butterworth-Heinemann, United Kingdom, 1989.

One example of a polycondensation reaction is the preparation of nylon 6,6. In well-known commercial practice, nylon 6,6 is prepared by polycondensation of hexamethylene diamine (HMD) with adipic acid. In the process, an aqueous salt solution of ca. 50/50 HMD and adipic acid is first prepared. A given salt solution can be characterized by a concentration of carboxyl ends and a concentration of amine ends, both in units of equivalents per $10^6$ grams of polymer. The ends balance is defined as the difference between the carboxyl ends concentration and the amine ends concentration. In typical practice, the solvent water is partially removed by evaporation, after which the solution is introduced to a reactor wherein additional solvent water is driven off along with water of reaction. Water of reaction must continue to be removed in order to drive the reaction to high molecular weight product.

In a typical commercial process, there is a narrow target range for the ends balance in the product so produced. Excessive variation in ends balance correlates with unacceptable variation in product properties. Maintaining the ends balance within the target range is thus an important aspect of nylon polymerization control. Ends balance is known to be altered by an alteration in the concentration of reactants or the occurrence of undesirable side reactions. In particular, it has long been known in the art that the water vapor vent gas streams contain some HMD, thus disturbing the balanced stoichiometry of the salt solution, resulting in undesired variations in molecular weight distribution, final polymer amine ends concentration, lower process yields, and more variable product than is theoretically possible. Trying to compensate for the lost HMD by addition of HMD during reaction without a knowledge of how much is being lost would merely substitute one problem for another. HMD during reaction without a knowledge of how much is being lost would merely substitute one problem for another.

It is further known in the art that certain undesirable side reactions occur during polymerization of nylon 6,6, which side reactions have a deleterious effect on productivity. The products of some such side reactions are volatile, and driven off in the water vapor vent gas stream. An example is cyclopentanone (CPK) which is formed from the thermal degradation of nylon 6,6.

Similar considerations to those hereinabove articulated in respect to nylon 6,6 apply to the formation of other polyamides produced by condensation of polymerizations involving HMD, such as nylon 6,10 or nylon 6,12, and to other condensation polymers including polyesters such as polyethylene terephthalate.

It is known in the art to use on-line real-time methods for analyzing hydrocarbon concentration in vent gas streams in certain small molecule chemical processes. It is further known in the art to use on-line real-time determinations of polymer product viscosity to provide input into closed loop process control of polymerization. However, the art has no teaching of any method for on-line real-time analysis of reactant concentration in a polymerization process nor of any means for achieving such analysis.

Rothstein (U.S. Pat. No. 3,754,125) broadly discloses means for closed loop process control of the reaction of a gas and a liquid wherein the gas feed is analyzed continuously for impurities and the gas feed rate adjusted to compensate therefor. Rothstein states explicitly that analysis of the vent gases is unsatisfactory because of the time lag between the occurrence of a process upset and the indication thereof in the composition of the vent gas stream, resulting in unacceptably high swings of impurity concentration within the reactor.

Ochiai (U.S. Pat. No. 3,972,946) discloses a process for conversion of alkenes to aldehydes and ketones by a catalyzed reaction with aqueous hydrochloric acid in the presence of cuprous chloride wherein the rate of addition of hydrochloric acid to the reaction is directly controlled by the continuous on-line determination of unreacted alkene in the vent gas flow from the reaction using infrared spectroscopy. Suitability of this configuration for closed loop process control is stated but no method therefor is described.

Amato et al. (U.S. Pat. No. 4,071,572) disclose a process for the oxyhydrochlorination of ethylene wherein the ethylene content of a vent gas stream is continuously monitored using infrared spectroscopy on the vent gas stream condensate, the data thereby provided used for adjusting the inflow of reactants to control the ethylene content in the vent gas stream within acceptable limits, thereby controlling the yield of the reaction.

Jordan (U.S. Pat. No. 4,630,038) describes an on-line automated self-calibrating analyzer employed to measure the hydrocarbon content of a vent gas stream from a solvent recovery unit. For Jordan's purposes, a continuous gas stream is provided to an on-line infrared analyzer capable of analyzing for numerous organic and inorganic species, including hydrocarbons. Data is stored and averaged over pre-set time intervals and displayed. The data storage device is also automatically interfaced with an alarm system providing immediate feedback should the hydrocarbon content exceed certain limits. A self calibration method involving the automated insertion of a blank and a known composition gas stream is provided.

Rao et al. (U.S. Pat. No. 4,952,345) disclose a process for spinning of polyamide. fibers wherein relative viscosity of the molten polymer is controlled by the humidity of the inert gas stream used to condition the polymer flake, the humidity being controlled by a feedback loop provided from continuous on-line determination of the melt viscosity of the polymer prior to spinning.

Buchelli (U.S. Pat. No. 5,065,336) describes a very generalized and theoretical means for computing the molecular weight distribution in real time of a polymer being formed in a continuous plug-flow polymerization reaction based upon online determination of polymer solution rheology. The results of the theoretical calculation can be employed in a closed-loop polymerization process control system to control molecular weight.

Laurent et al, (U.S. Pat. No. 5,155,184) describe a process for the manufacture of a polymer having at least one property P with a desired value D, the process being controlled by periodically sampling the polymer produced, determining the value of the property P by applying a correlation relationship with absorbance measurements in the near infrared, and then using the difference between the determined value of the property P and the desired value D to control the process parameters using a process computer.

SUMMARY OF THE INVENTION

The present invention provides for a method for controlling the properties of the product polymer of a polymerization process, the process comprising at least one means for controlling at least one process input parameter and a means for venting the gases generated during the polymerization, thereby forming a vent gas stream, the method comprising diverting at least a portion of the vent gas stream to a compositional analysis means;

analyzing the diverted portion of the vent gas stream to determine the concentration of at least one component of the vent gas stream;

ascertaining a rate of loss of the at least one component of the vent gas stream;

comparing the rate of loss to a predetermined goal in order to provide an indication of the corrective action required; and executing the corrective action indicated.

DETAILED DESCRIPTION OF THE INVENTION

Figure 1:
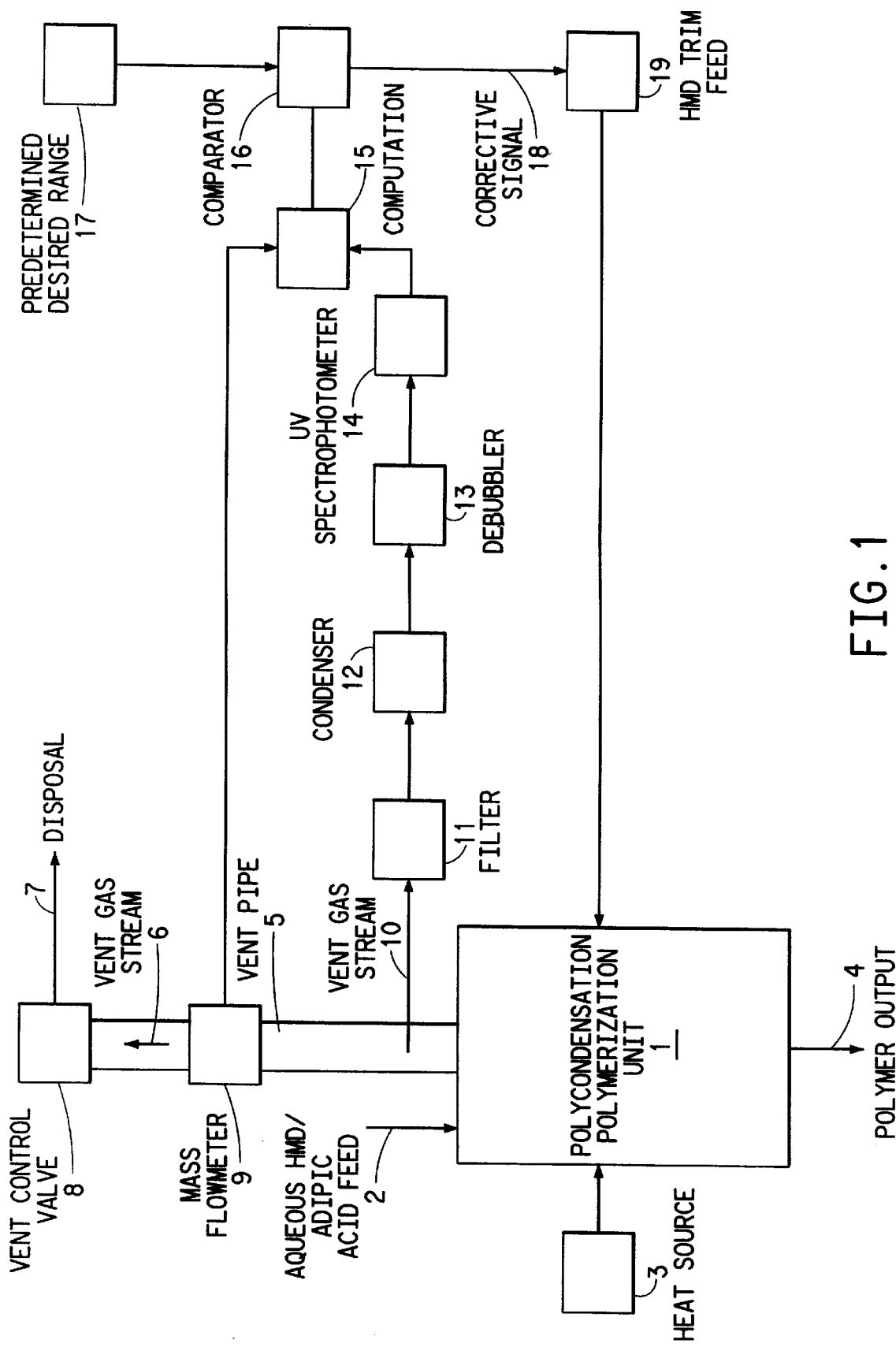
FIG. 1 depicts in block diagram form an apparatus suitable for use in the preferred embodiment of the invention.

Reference is now made to the drawings where the showings are for the purpose of illustrating a preferred embodiment of the invention and not for limiting same.

In a preferred embodiment, the present invention provides for a method whereby a small portion of the vent gas stream from the polymerization reaction of hexamethylene diamine with adipic acid to form nylon 6,6 is diverted through a series of ports and tubes to a means for determining the concentration of therein, while simultaneously the vent gas stream flow rate is determined. The rate of evolution of the HMD is determined from the equation:

$$R(t') = [HMD(t')] \times F(t')$$

where R(t') is the rate of HMD evolution in kg/hour at time t', [HMD(t')] represents the weight percent concentration of HMD at time t', and F(t') is the rate of flow of the vent gas stream in kg/hour. The overall rate of HMD loss over a period of time, such as the duration of a single polymerization cycle in an autoclave, may be determined by integrating the function described by R(t). Similar analyses may be applied to volatile reaction by-products such as cyclopentanone.

There are no particular limitations on the method of analysis employed except that the method must be selected to be capable of detecting the species of interest, and must be capable of providing a real-time concentration determination on a sample stream. Several means of analysis known in the art are suitable for the method of the invention. These include infrared spectroscopy, ultraviolet (UV) spectrometry, mass spectrometry, ion selective electrodes, pH measurement, and solid state specific detectors.

It will be understood by the average practitioner that each of these techniques may be applied through a wide range of available instrumentation varying in sophistication, sensitivity, and selectivity.

Any particular means of analysis selected may impose additional practical limitations which will affect the design for a practical sample handling system, as hereinbelow described for a particular choice of UV spectroscopy.

The term "real time" as employed herein is a practical term depending upon the requisites of the particular application. For the purposes of the present invention "real-time" means that the determination of rate of evolution occurs on a time scale that is shorter than the response time of the process to alteration in process conditions. Thus in a batch process, the rate of evolution must be determined at a time scale shorter than the time of reaction of a single batch. In a continuous process, the time scale is determined by the scale of the process. A large continuous process may take hours to exhibit changes in input parameters; determination of and adjustment to the process on too short a time scale might induce process instability. In such a case, the determination and adjustment may be based upon a sophisticated mathematical protocol devised to optimize process response while avoiding instability. "Real-time" in such a case could be a matter of several minutes or more.

In some cases, the transit time of the vent gas specimen to the detection means may be long compared to the time when the overall flow rate is determined. In such a case, in order to maintain the real-time attribute of the measurement, a time delay needs to be included in the value of the flow rate employed in the rate of loss calculation.

The term "real-time" is meant to distinguish over the methods practiced in the art wherein time-consuming off-line measurements of product properties have mostly retrospective significance and provide little benefit to process control.

It has been found in the practice of the preferred embodiment of the invention that particle-forming matter is entrained in the vent gas stream, and that the particles formed, mostly but not exclusively as a result of cooling, cause fouling of transfer lines, valves, instrument ports, and other components. Thus any means for sampling the vent gas stream in order to determine the concentration therein of HMD, CPK or other species in order to be practical must provide a filtration step and a means for periodically clearing or replacing the filters.

The flow rate of the vent gas stream can be determined in any convenient manner known in the art. This includes placing a flowmeter directly in the vent gas line. It is also possible to estimate the flow using known chemical engineering principles.

The method of the invention is suitable for application in both batch and continuous polymerization processes. Among the benefits achievable by the practice of the invention are improvements in product uniformity and properties, increased reaction yields, and increased asset productivity.

In one embodiment of the present invention, the method is applied to an autoclave batch process. In this embodiment, the vent gas stream of the polymerization process of HMD and adipic acid is analyzed to determine the concentration of HMD and CPK, as hereinbelow described, and the flow rate of vent gas is determined as hereinabove described, the two measurements combined mathematically as hereinabove described to provide the total HMD loss in the vent gas stream, and the amount of CPK generated into the vent gas stream is determined. Also the rate of change with respect to time of the these constituents is determined. Once the HMD loss is known for a given batch, the total HMD concentration for future batches of similar recipes is adjusted to compensate for the change in HMD loss versus a target loss range. This has the effect of reducing the batch-to-batch variation of ends balance. Making this measurement on various autoclave units reduces autoclave-to-autoclave ends balance variation. Reducing ends balance variation improves process yields and product quality. In addition, making a similar measurement on the vent gas of the evaporator unit feeding the autoclave further reduces ends balance variation.

In a similar manner, the rate of production of CPK is an indicator of the rate of polymer degradation during the polymerization process. An acceptable CPK level is established for the reaction. If in the practice of the invention the CPK level is determined to have been elevated during an autoclave cycle, then heat input into the autoclave can be reduced near the end of the run in future batches of similar recipes in order to reduce thermal degradation and improve process yields and product quality. Similarly, if the CPK level drops well below the target range, then heat input into the autoclave can be increased near the end of the run for future batches of similar recipes in order to increase the rate of polymerization.

In another embodiment of the present invention, the method is applied to a continuous polymerization process. In this embodiment, the several vent gas streams of the polymerization process are analyzed separately to determine the concentration of HMD and CPK being evolved by the various distinct process units such as the evaporator, reactor, separator, and finisher.

Among the benefits achievable by the practice of the invention in conjunction with a batch polymerization process are improvements in product properties and uniformity from batch-to-batch and from autoclave-to-autoclave, increased reaction yields, and increased asset productivity via reduced polymerization cycle time. The benefits achievable by the practice of the invention in conjunction with a CP polymerization process are improved process dynamics, increased process yields and productivity, and improved product properties.

The practice of the present invention offers numerous benefits not heretofore available in condensation polymerizations. The improvements in basic understanding of the dynamics of the process derived from the time-resolved determination of rate of evolution of vent gas components provides engineering insights into the process mechanism which leads to process improvements. This would include advanced process control strategies for real-time control of both the batch and CP processes rather than relying on delayed laboratory analysis of the polymer to adjust process conditions.

The means by which adjustments in the process may be accomplished according to the method of the invention may be continuous or discontinuous, with or without direct human intervention. In one embodiment of the process control method of this invention a human operator may monitor the output of the method of the invention and periodically adjust heat input and/or HMD addition rate in response to previously established correlations with, respectively, degradation rates and product ends balance. In a preferred embodiment, the rates of evolution of the various components of the vent gas stream may be fed to a computer controlled closed loop process control system so that adjustments may be performed automatically.

In order to accomplish the objectives of this invention, the vent gas stream concentration of the gaseous species of interest must be determined as a function of time, while the rate of flow of the vent gas stream is simultaneously determined. In order to accomplish the concentration measurement, it is necessary to continuously or semi-continuously (that is for a period of time necessary to establish a curve during particular stages of the process, but not necessarily continuously) extract a small, representative sample from the vent gas stream, condition it in a manner appropriate to the detection system chosen, convey it to a detector, make the required measurement, discharge the sample, and provide the results in a manner which can be acted upon.

Sample conditioning hereinabove referred to may involve condensation of the gas into a liquid, filtration, debubbling, and the like in order to prepare the sample for unambiguous analysis by the selected analysis means. It has been found in the practice of the invention that a small back pressure prevents foaming from vent gas condensate containing carbon dioxide produced by thermal degradation of the polymer.

The extracted vent gas sample is typically conveyed to the analysis means by means of a series of ports, tubes, and valves. In order to achieve a real-time analysis of the sample, and maintain correlation with the flow rate measurement which is being made essentially simultaneously with sample extraction, it is required that the time between sample extraction and sample analysis be kept short. It may be necessary to correct for the time lag between flow rate measurement and sample analysis.

It may be necessary or desirable to convert the gas stream into a liquid stream to achieve a meaningful analysis. The particular requisites of the chosen analysis means may add further limitations on the practical range of operability of the invention. For example, if condensation of the vent gas sample is required, care must be taken that the volumetric flow rate of the vent gas sample through the condenser does not exceed the cooling capacity thereof, resulting in only partial condensation. On the other hand, excessively low flow rates are undesirable because they may result in unacceptably long delay between sample extraction and analysis.

The optimum combination of valves and tubing cross-sections and lengths will depend upon the pressure range of the vent gas stream and the particular analysis means employed because of the flow rate and pressure limitations to the analysis means. These optima can be determined by using well-known principles of chemical engineering.

A required element of the method of the invention is the establishment, prior to implementation of the method, of correlations connecting the several variables of interest such as stoichiometry of adipic acid and HMD, rate of degradation as indicated by CPK, temperature, and various polymer properties. The polymeric properties it is desired to control must be identified. Such properties may include ends balance, molecular weight, polydispersity, dyeability, degree of branching, contamination levels including gel content, impact strength, tensile strength, modulus, and so forth.

When the desired polymeric properties are identified, a correlation between the measured value of those properties and one or more of the measured values of vent gas component evolution rate must be established, as, for example by performing a multivariate statistically designed experiment. Once such a correlation is established, tolerances in vent gas component evolution rate are established to correspond to the product tolerances set by the practical demands of business necessity. The range so established is then the goal range against which the actual composition determined in the practice of the invention is compared.

A similar correlation between one or more process inputs, such as feed rate, feed composition, heating and temperature, pressure, and throughput, among others, and the vent gas component composition must also be established. The correlation thereof permits the computation of a correction to the process inputs in order to reduce the discrepancy between the actual value and the target range for the vent gas component composition.

The so-computed correction must generate some corrective action, whether it is the deviation of a meter indicator read out and an adjustment by a human operator or a computer generated closed loop control signal.

FIG. 1 depicts in block diagram form an apparatus suitable for practice of the preferred embodiment of the present invention. Polycondensation polymerization vessel, 1, is fed with an aqueous salt formed from HMD and adipic acid, 2, and provided with variable heat means, 3, the vessel having an output of nylon 6,6, 4. The vessel is provided with a vent pipe, 5, through which flows the vent gas stream, 6, to disposal, 7. A vent control valve, 8, controls the pressure in the vessel. A gas flowmeter, 9, is located within the vent gas stream, 6, to monitor overall flow. A small portion of the vent gas stream, 10, is diverted through a filtering means, 11, a condensation means, 12, and a debubbling means, 13, to a flow-through UV spectrophotometer, 14, tuned to 200–350 nm wavelength to detect HMD. The rate of loss of HMD is determined by multiplying the flow meter and concentration measurements using a computation means, 15. The computed value of the rate of loss is compared with a desired range of values employing a comparison means, 16, the desired range, 17, having been set from a predetermined correlation between the rate of loss of the species of interest and the product property or properties of interest. The deviation determined by the comparison means, 16, generates a corrective signal, 18, which is transmitted to the HMD trim feed, 19, causing the total feed rate of HMD to be altered in order to bring into line the computed value of the rate of loss with the desired range of values.

It will be understood by one of skill in the art that the mathematical models employed in process control range from very simple to quite complex depending upon the degree of control required, the complexity of the process, and the sophistication of the practitioner. However, the essential features of the present invention remain unchanged.

The polycondensation polymerization vessel may be either a batch polymerizer, such as an autoclave, or a continuous polymerizer. It will be understood by one of skill in the art that a large number of variations in the equipment and procedures associated with performing a polycondensation reaction are possible without substantively changing the practice of the present invention.

In the most preferred embodiment of the present invention, as indicated in FIG. 1, ultraviolet (UV) spectrophotometry is employed to detect the amine functionality of HMD in the vent gas stream. The UV spectrophotometric measurement is preferably accomplished on the liquid stream formed by condensation of the vent gases rather than the gases themselves; for that reason, condensation means, 12, is employed. Numerous methods are known in chemical process engineering for condensing a gas stream to a liquid; any such method may be employed herein. It has been found in the practice of the present invention that the condensed gas stream may contain nitrogen bubbles which interferes with the spectrophotometric measurement. It is thus advisable to employ a debubbling device as known in the art to remove the nitrogen prior to entry into the detector flow cell.

As described elsewhere herein, filtration is required to remove the particles formed in the vent gas stream, particularly as it cools. FIG. 1 depicts a filter, 11, positioned to filter the gas stream, 10, prior to condensation in condenser, 12. While numerous means for filtration are known in the art and may be employed in the practice of the present invention, a 15 micron sintered metal filter is preferred such as is available from Swagelok/Nupro, Willoughby, OH. It is found in the practice of the present invention that despite filtration prior to condensation, particles larger than 15 micrometers appear in the condensate. These particles are thought to be formed after the condensate liquid is formed from particles finer than 15 micrometers which passed through the initial filtration step. This secondary particulate matter can be prevented from fouling the system by maintaining flow along with occasional flushing with water at intervals dictated by the extent of particle formation and the requisites of the particular embodiment of the present invention employed.

While UV spectrophotometry is preferred for the use in the preferred embodiment of the present invention, it will be appreciated by those skilled in the art that other forms of chemical analysis are suitable for the practice of the invention, and may be preferred in a different embodiment. These methods include gas chromatography, mass spectrometry, infrared spectroscopy, colorimetry, pH determination, use of ion-selective electrodes, and other methods as are well-known in the art.

The gas flow rate of the vent stream must be determined simultaneously with the concentration determination made by the UV spectrophotometer. This is best accomplished by employing a flow meter in the vent gas stream. Preferably, flow meters having small orifices are to be avoided. Several types of flow meters suitable for the practice of the invention are commercially available. Preferably, simultaneity is achieved by keeping the transfer line to the UV spectrophotometer short, and, in the case where flow rates to the spectrophotometer are particularly low, by compensating for the time delay.

In some embodiments of the present invention it is not necessary to measure the flow rate of the vent gas stream in order to observe a change in the process. In embodiments of that variety, the flow rate may be assumed to be approximately constant compared with the magnitude of the changes in, e.g., HMD concentration observed. In such a case, the rate of HMD loss is indicated entirely by the change in concentration. In such a circumstance, it is preferable to have an indirect indicator of flow rate available to provide confirmation that the flow rate has indeed remained approximately constant when the concentration is observed to undergo a change. Such indirect indicators of flow rate include, but are not limited to, the temperature of a boiling liquid or the pressure in a vessel.

The computation means, 15, may involve any means for accomplishing the necessary computation of compositional flow rate. The concentration of the species of interest is determined spectrophotometrically as a percentage of the vent gas stream. That percentage multiplied by the total vent gas mass flow rate provides the actual flow rate, or rate of loss, of the species of interest. Suitable means for performing the computation include but are not limited to electronic computers, and paper and pencil.

Once the actual rate of loss is computed, this value may be compared to a goal value, or range of values, previously established by correlating rate of loss with product properties. The means of comparison may be any that is suitable for the particular embodiment. Preferably the means is an electronic computer programmed to make the requisite comparison, but it may simply involve a human operator reading a chart, or comparing the position of an indicator on a meter versus a goal position.

In a preferred embodiment depicted in FIG. 1, once the deviation is determined by the comparison means, 16, a corrective signal is sent directly to the HMD trim feed, 19, to compensate for the deviation in HMD loss rate from the goal.

In another embodiment, the corrective action resulting from the comparison may be a well-defined sequence of maintenance steps in a discontinuous procedure. For example, a sudden change in the rate of loss of a component of the vent gas stream may indicate a failure of a pump or a heater, and the corrective action is to replace the pump.

The following three constructive examples, which are done based on a proprietary mathematical model, depict specific embodiments of the practice of the method of the invention. In each example, an autoclave is charged with an aqueous salt of HMD and adipic acid, run under specified conditions with a certain resultant loss of HMD, the HMD loss being monitored according to the method of the invention. In the first example, a first set of polymerization conditions results in a product of a particular ends balance, a critical product quality control parameter. In the second example, a second set of polymerization conditions represents a significant deviation from the first set of conditions resulting in a product exhibiting an ends balance quite different from that obtained in the first example. The deviation in conditions is signaled by a change in the HMD loss curve. In the third example the polymerization conditions are the same as those of the second example, but the HMD added to the reaction is adjusted according to the method of the invention to compensate for the difference in HMD loss between that of the first example and that of the second, with the result that the while the HMD loss curve of the third example is coincident with that of the second example, the polymer produced in the third example exhibits the ends balance of that of the first example.

EXAMPLE 1

Figure 2:
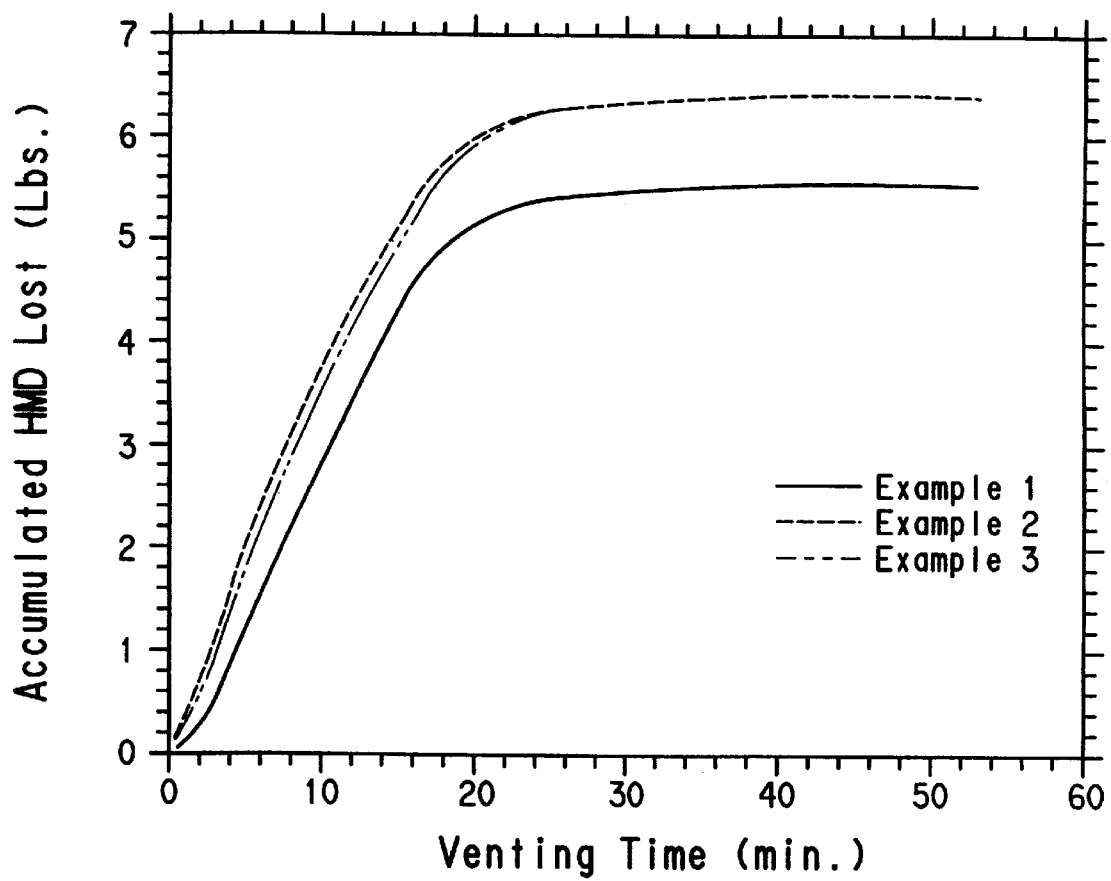
FIG. 2 depicts the cumulative loss of HMD as a function of time in the three examples hereinbelow.

An autoclave is charged with 3,500 lbs. of nylon 6,6 salt solution containing 20% water with the remainder being HMD and adipic acid. There is a 1.5 lb. excess of HMD in the salt. The solution is heated with the vent closed until the pressure reached 294.7 psia at which time the vent valve is opened and the pressure is then controlled to 294.7 psia. This pressure is maintained for 29 minutes at which time the pressure is linearly reduced to atmospheric over 23 minutes. FIG. 2 shows the cumulative HMD loss curve from the autoclave during the venting period with the total HMD lost for the run being 5.6 lbs.

The resulting polymer exhibits difference of ends of 22. Difference of ends is defined as the difference of total concentration of carboxyl ends minus total concentration of amine ends in the solution. All ends units are in gram equivalents/$10^6$ grams of polymer.

EXAMPLE 2

Example 2 is identical to Example 1 except that the vent valve is opened when the pressure reaches 264.7 psia and pressure is then held at 264.7 psia FIG. 2 shows the cumulative HMD loss curve from the autoclave during the venting period. The amount of HMD lost during this run is 6.4 lbs. and the final difference in ends is 27.5. Thus according to the method of the invention, 0.8 lbs more HMD is lost in Example 2 than in Example 1.

EXAMPLE 3

Example 3 is identical to Example 2 except that an additional 0.8 lbs (i.e., 0.023% of the total charge to the autoclave) of HMD is added to the initial autoclave charge to compensate for the greater loss of HMD as determined by the method of the invention to occur under conditions of Example 2 over those of Example 1. FIG. 2 shows the accumulated HMD from the autoclave during the venting period. The amount of HMD lost during this run is 6.4 lbs, exactly as predicted from Example 2. However, the final difference in ends is 22.0, exactly as found in Example 1.

It is claimed:

1. A method for controlling the variability of the product polymer properties in a polymerization process, the method comprising at least one means for varying at least one process input parameter and a means for venting the gases generated during the polymerization, thereby forming a vent gas stream, the method comprising:

diverting at least a portion of the vent gas stream to a compositional analysis means;

analyzing the diverted portion of the vent gas stream to determine the variability in concentration of at least one component of the vent gas stream;

ascertaining a degree of variability in the rate of loss of the at least one component of the vent gas stream;

determining whether the degree of variability so determined exceeds a predetermined amount; and, if the degree of variablity exceeds the predetermined amount, causing the at least one process input parameter to be varied in a manner which has the effect of reducing the degree of variability in the rate of loss of the at least one component of the vent gas stream so that the degree of variability will not exceed the predetermined amount.

2. The method of claim 1, wherein the process is a condensation polymerization.

3. The method of claim 2, wherein the product polymer is polyamide.

4. The method of claim 3, wherein the product polymer is nylon 6,12 or nylon 6,6.

5. The method of claim 4, wherein the product polymer is nylon 6,6.

6. The method of claim 5, wherein the at least one process input parameter is selected from the group consisting of the feed rate of hexamethylenediamine, the polymerization temperature, the polymerization pressure, and combinations thereof.

7. The method of claim 6 wherein the at least one process input parameter is the polymerization temperature.

8. The method of claim 2, wherein the product polymer is polyester.

9. The method of claim 1, wherein the polymerization is performed in a continuous process.

10. The method of claim 1, wherein the polymerization is performed in a batch process.

11. The method of claim 1, further comprising the step of filtering the diverted portion of the vent gas stream prior to determining the composition thereof.

12. The method of claim 1, wherein the concentration is determined by ultraviolet spectrophotometry.

13. The method of claim 1, further comprising the step of condensing the vent gas stream prior to determining the concentration.

14. The method of claim 13, further comprising the step of debubbling the condensate prior to determining the concentration.

15. The method of claim 1, wherein the steps are performed as part of an automated closed loop computer driven process control protocol.

16. The method of claim 1, wherein at least one step is performed by a human being.

17. The method of claim 1, further comprising the step of directly measuring the flow rate of the vent gas stream.

* * * * *